Feb. 15, 1949.  T. C. MANNING  2,461,649
AUTOMATIC GRAIN FUMIGANT APPLICATION SYSTEM
Filed March 24, 1947  2 Sheets-Sheet 1

INVENTOR.
Timothy C. Manning
BY
ATTORNEY.

Feb. 15, 1949.  T. C. MANNING  2,461,649
AUTOMATIC GRAIN FUMIGANT APPLICATION SYSTEM
Filed March 24, 1947  2 Sheets-Sheet 2

INVENTOR.
Timothy C. Manning
BY
ATTORNEY.

Patented Feb. 15, 1949

2,461,649

UNITED STATES PATENT OFFICE 2,461,649

AUTOMATIC GRAIN FUMIGANT APPLICATION SYSTEM

Timothy C. Manning, Kansas City, Mo., assignor to Uhlmann Grain Company, Chicago, Ill., a corporation of Illinois Application March 24, 1947, Serial No. 736,672

4 Claims. (Cl. 21—108)

1

This invention relates to a system for automatically applying vaporous fumigant or the like under pressure to grain such as wheat, oats, millet or other cereal products as the grain is directed in a stream into a hopper.

Heretofore the most common method of fumigating grains has been through the process of immersion of the grains in a liquid fumigant resulting in many disadvantages. One of the greatest of these disadvantages lies in the waste of the fumigant since the grain tends to become saturated with more of the fumigant than is necessary, and also, such immersion of the grain tends to cause subsequent spoilage because of excess moisture. Additionally, it is well known by those skilled in the field, that most of the disastrous fires in grain elevators and other storage centers have been caused by the inflammable nature of the fumigant used and the application thereof to the grain in excess quantities, thereby enhancing the probability of internal combustion or other cause for fire.

It is the primary object of this invention therefore, to provide an automatic grain fumigant application system that obviates all of the above disadvantages set forth, as well as others through the medium of applying the fumigant to the grain in the form of a vapor which is just as efficient as immersion and much more economical, as well as desirable from the standpoint of protecting the grain being treated.

The most important object of this invention is to provide a grain fumigating system utilizing the teachings of U. S. Letters Patent No. 1,928,903, issued October 3, 1933, in treating grain automatically as the same is conveyed into a hopper for movement by force of gravity into the open top of a storage bin.

Another important object of the present invention is to provide a grain fumigating system having a hopper mounted upon a movable carriage disposed above the open tops of a series of grain receiving bins, the hopper being provided with a perforated tube for receiving the vaporous fumigant under pressure and directing the same into the grain as the latter flows through the hopper.

A further object of this invention is to provide a grain fumigating system wherein is provided a plurality of valved outlet nozzles for the vaporous fumigant arranged in substantial alignment with the series of bins to the end that the perforated tube within the hopper may be selectively connected to a corresponding outlet nozzle in accordance with the particular bin being filled with grain flowing through said hopper.

2

A still further object of this invention is the provision of special grain conveying means in the nature of an endless belt so connected to the shiftable carriage for the hopper as to permit shifting of the carriage to selected bins without readjustment of the belt or any part of the carriage, the hopper or the supporting means for the belt.

Many other objects will be made clear or become apparent during the course of the following specification, reference being had to the accompanying drawings, wherein:

Fig. 4 is a cross sectional view taken on line IV—IV of Fig. 2, looking in the direction of the arrows.

The system about to be described contemplates the use of a pressure tank 10 adapted to contain a filling 12 of liquid fumigant which is directed into tank 10 through the medium of a pipe 14 in communication with a source of the fumigant not shown.

Figure 1:
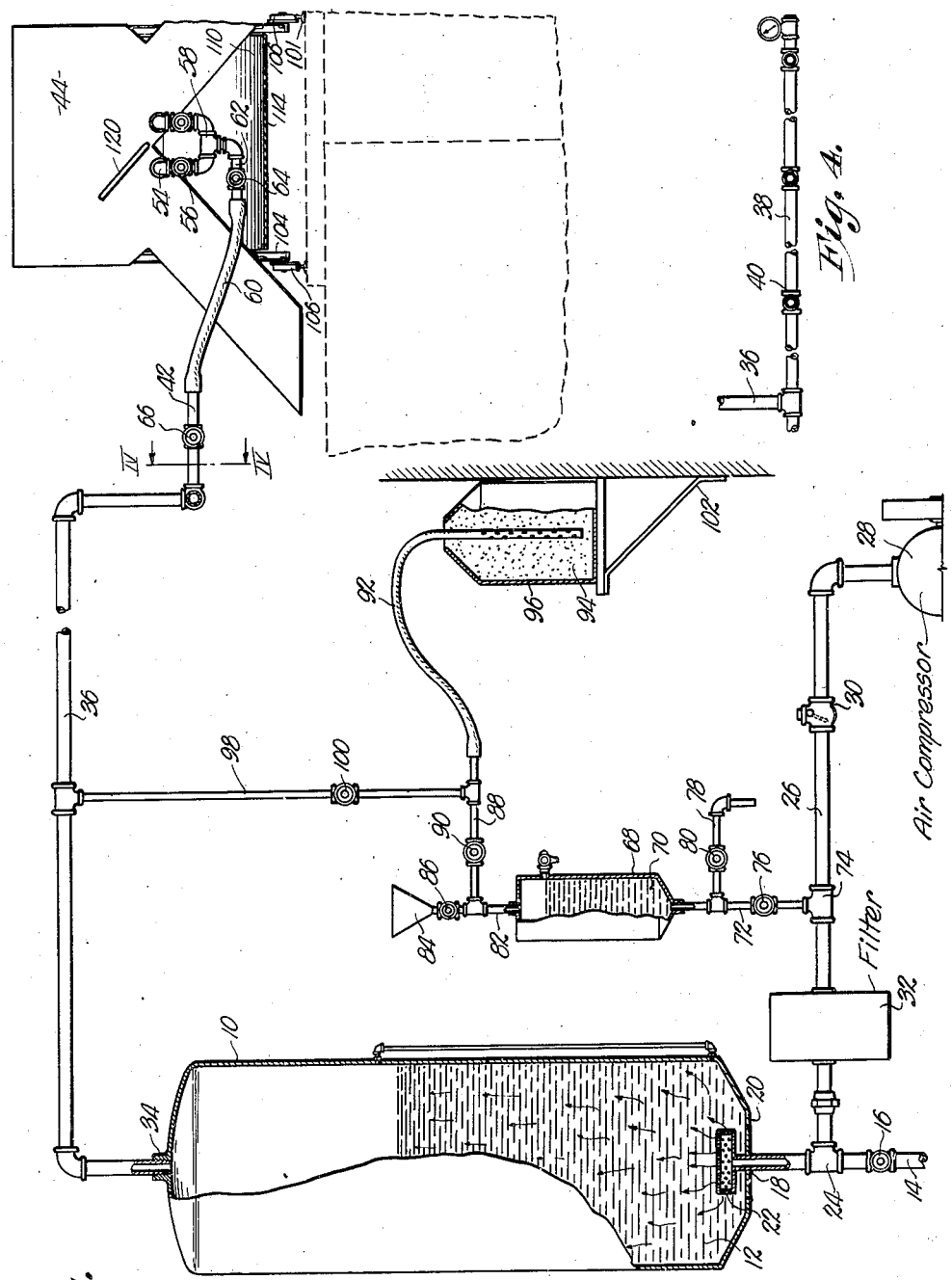
Fig. 1 is a side elevational view of all the component parts of the automatic grain fumigant application system forming the subject matter of my present invention, parts being broken away to reveal details of construction of certain of said parts.

A manually manipulable valve 16 is interposed within this pipe 14 to control the flow of the fumigant 12 into the pressure tank 10. An inlet opening 18 in the normally bottom wall 20 of tank 10 receives the pipe 14, the latter of which is secured to the pressure tank 10 by welding or other means of securement as illustrated in Fig. 1.

The pipe 14 carries a perforated head 22 at the uppermost end thereof and this head 22 is disposed within the tank 10 and the liquid 12 in spaced relation from the bottom wall 20 of tank 10. A T-joint 24 in the pipe 14 exteriorly of the pressure tank 10 receives an elongated pipe 26, which pipe 26 in turn communicates with an air compressor 28.

A check valve 30 within the pipe 26 permits flow of pressurized fluid from the air compressor 28 to the pressure tank 10 and at the same time prevents flow of the liquid 12 from tank 10 to the air compressor 28 when the latter is not in operation.

A filter 32 is interposed in the pipe 26 and has a filling of silica gel or other substance serving to remove moisture from the fluid generated by the air compressor 28 before such pressurized fluids enters the pressure tank 10.

An outlet opening 34 is formed in the normally uppermost end of the pressure tank 10 for receiving one end of a conduit 36. The opposite end of the conduit 36 carries a manifold 38 consisting of a plurality of tubular members interconnected by the joints 40, each of which joints 40 has a stub pipe 42 extending laterally from the manifold 38.

Figure 2:
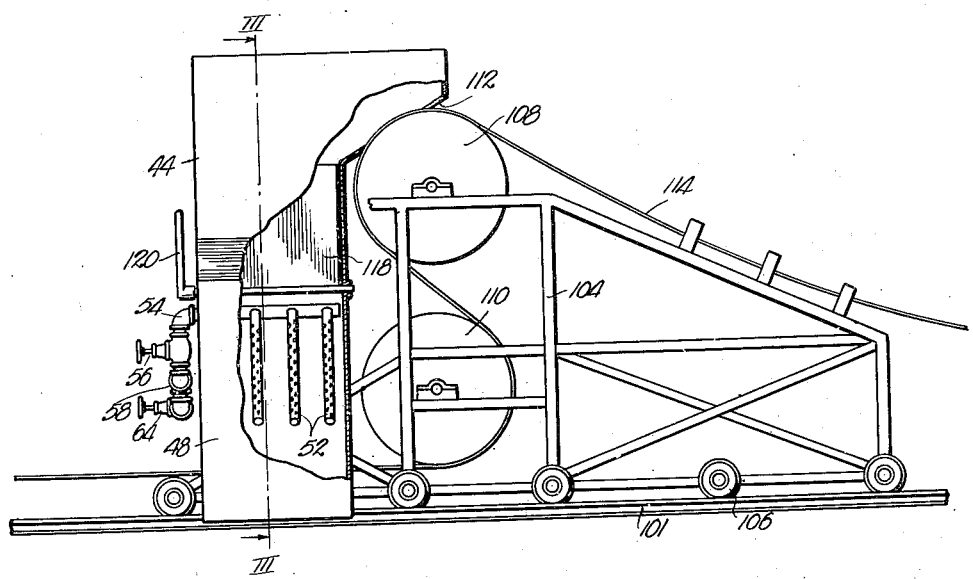
Fig. 2 is an end elevational view of the grain handling structure per se, parts being broken away for clearness.

A hopper, broadly designated by the numeral 44 includes a pair of branches 46 and 48 within each of which is disposed a plurality of spray heads 50 and 52 respectively. Each of these spray heads 50 and 52 has a pipe 54 in communication therewith and extending into the respective branch 46 or 48 from the exterior of hopper 44, as clearly illustrated in Figs. 1 and 2. This pipe 44 has a cut-off valve 56 interposed therein and communicates with a common joint 58, which in turn is in communication with a flexible hose 60 through the medium of a pipe 62. This pipe 62 also has a cut-off valve 64 therein as does each of the stub pipes 42 as at 66. It is clear at this point that the flexible hose 60 places a conduit 36 in communication with the nozzles 50 and 52 and may be joined to any one of the short pipes 42 as desired.

Means for testing the fumigant being used is also interposed in the system just described and comprises a second somewhat smaller pressure tank 68 for receiving the liquid fumigant to be tested indicated by the numeral 70. This pressure tank 68 has a tubular member 72 in communication therewith at its bottom and joined to a T-member 74 within the pipe 26, which tubular member 72 is provided with a cut-off valve 76.

Means for draining the pressure tank 68 includes a short pipe 78 having a valve 80 therein. A pipe 82 in communication with the tank 68 at its uppermost end, has a funnel 84 for receiving the liquid 70 to be introduced into the tank 68 when a valve 86 within pipe 82 is opened. A tube 88 having connection with the pipe 82 is provided with a valve 90 and a flexible hose 92, which hose 92 has a plurality of perforations adjacent the free end thereof and is inserted into a quantity of grain 94 within a container 96. A vertically disposed pipe 98 having a valve 100 therein, interconnects the conduit 36 and the tube 88.

Figure 3:
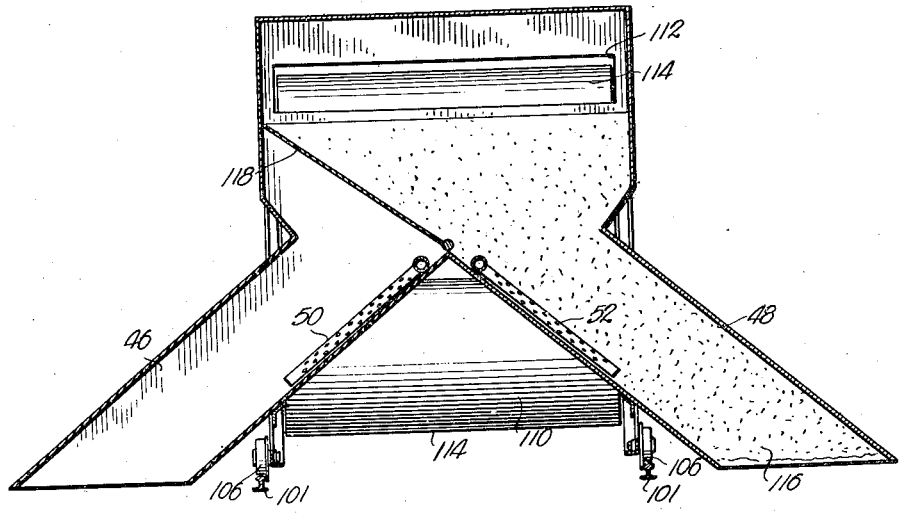
Fig. 3 is a cross sectional view taken on line III—III of Fig. 2.

The hopper 44 is mounted for reciprocation upon a pair of spaced apart tracks 101 disposed in overlying relation with a compartmented storage bin 102. A framework broadly designated by the numeral 104 carries a plurality of pulley wheels 106 engageable with the tracks 101 for supporting not only the hopper 44 but a pair of rotatable drums 108 and 110. The drum 108 extends into the hopper 44 through an opening 112 therein and carries an endless conveyor belt 114 in the manner illustrated in Fig. 2. This conveyor belt 114 extends from a point of receipt of the grain to be treated (not shown), passes over the drum 108 and thence downwardly to pass beneath the drum 110, whence belt 114 continues to a point of connection (not shown) continuous to the point where the grain is being unloaded or otherwise directed to the belt 114. It is readily seen therefore, that the hopper 44, the framework 104 and the drums 108 and 110, may be bodily moved along the tracks 101 to overlie one of the number of compartments formed in the storage bin 102. When such action takes place, no lengthening or shortening of the endless belt 114 is necessary because of the manner of extending the same over the drums 108 and 110. The branches 46 and 48 of the hopper 44 are open at their lowermost ends as shown in Fig. 3 and when the grain 116 is introduced into the hopper 44, the same is free to flow down either the branch 46 or 48 into the storage bin 102, depending upon the position of a tripper 118 operable through the medium of a lever 120 disposed exteriorly of the hopper 44 adjacent the valves 56 and 64.

In operation, the fumigant 12 is introduced into the tank 10 through the pipe 14 to a predetermined level as indicated in Fig. 1, whereupon the valve 16 is closed. The compressor 28 is caused to be operated for introducing fluid under pressure into the fluid 12 within the tank 10 through the perforated head 22. This pressurized liquid will move upwardly through the fluid 12 as indicated by arrows in Fig. 1 to create a vapor within the uppermost portion of tank 10, which in turn flows into the conduit 36. The hopper 44 is disposed above the desired compartment within the bin 102 and the conveyor belt 114 is actuated by force of power not shown, to move the grain in a relatively fine stream into the hopper 44. This grain 116 will fall upon either the spray heads 50 or 52, depending upon the position of the tripper 118 and when the valves 66, 64 and the appropriate valve 56, are all opened, the vapor emanating from the tank 10 will be directed into the grain 116.

It is to be noted that during this stage of the operation, the valves 76 and 100 will each be closed. If during this operation just described, it is desired to test a fumigant with respect to its inflammable nature, the valves 76 and 90 are each opened and the valve 86 is closed. Compressor 28 will direct compressed air not only into the pressure tank 10 but into the tank 68 through the pipe 72. The vapor created within tank 68 will flow through pipe 88 and hose 92 to be dispersed within the quantity of grain 94 contained in the receptacle 96. The well known "flash" test is then applied to the grain 94 to determine whether or not the fumigant 70 within the tank 68 is inflammable. In the event that it is desired to conduct the same test upon the fumigant 12 within the tank 10, the valves 76 and 90 are each closed and the valve 100 is opened to the end that the vapor emanating from tank 10 may flow into the receptacle 96 through conduit 36, pipe 98, a portion of tube 88 and the hose 92.

It is notable that this last test with respect to the fluid 12 may be conducted whether or not the grain 116 is being treated through the spray heads 50 or 52.

Manifestly, the various elements used in the fumigant application system just described are primarily illustrated schematically, and it is, therefore, understood that many changes and modifications may be made particularly in details of construction of any one of these elements without departing from the general objects and operation of the system per se. It is, therefore, desired to be limited only by the spirit of the invention and scope of the appended claims.

Having thus described the invention, what is claimed as new and desired to be secured by Letters Patent is:

1. In a grain fumigating system of the kind described, a source of compressed, vaporous fumigant; a series of open top bins; a mobile hopper for receiving grain to be fumigated, said hopper having at least one outlet spout and being mounted for movement above said bins with spout selectively registrable with said open top of the bins; at least one perforated tubular member in the hopper within the path of travel of grain passing through said hopper to a selected bin; a conduit extending through the hopper and connecting with said member; a manifold for receiving said fumigant, said manifold having a number of valved outlets in spaced alignment with said series of bins; and removable means for connecting said conduit and the outlet corresponding with the bin being filled with grain from the conduit.

2. In a grain fumigating system of the kind described, a series of open top bins; a shiftable hopper overlying said bins and having at least one elongated outlet spout selectively registrable with said top of the bins as the hopper is shifted; a perforated tube within the hopper disposed in the path of travel of grain to be fumigated and passing through said spout to a selected bin; and means for introducing compressed, vaporous fumigating material into the tubular member for passage therefrom into the moving grain through said perforations, said means including a valved nozzle for each bin respectively for receiving the fumigating material, a pipe extending from the member to the exterior of the hopper, and a removable connecting conduit between the pipe and a selected nozzle.

3. In a grain fumigating system of the kind described, a series of open top bins; a shiftable hopper overlying said bins and having at least one elongated outlet spout selectively registrable with said top of the bins as the hopper is shifted; a perforated tube within the hopper disposed in the path of travel of grain to be fumigated and passing through said spout to a selected bin; means for introducing compressed, vaporous fumigating material into the tubular member for passage therefrom into the moving grain through said perforations; and structure for conveying said grain to the hopper including an endless belt, a carriage for the hopper, and a number of rotatable drums mounted on the carriage for receiving said belt, one of the drums being disposed to hold the belt into communication with the hopper.

4. In a grain fumigating system of the kind described, a series of open top bins; a shiftable hopper overlying said bins and having at least one elongated outlet spout selectively registrable with said top of the bins as the hopper is shifted; a perforated tube within the hopper disposed in the path of travel of grain to be fumigated and passing through said spout to a selected bin; means for introducing compressed, vaporous fumigating material into the tubular member for passage therefrom into the moving grain through said perforations; and structure for conveying said grain to the hopper including an endless belt, a carriage for the hopper, and a pair of superimposed drums on the carriage, rotatable oppositely on substantially horizontal axes for receiving the belt, the uppermost drum being disposed to empty grain carried by the belt into said hopper.

TIMOTHY C. MANNING.

REFERENCES CITED

The following references are of record in the file of this patent:

UNITED STATES PATENTS

| Number | Name | Date |
| --- | --- | --- |
| 1,446,072 | Todd | Aug. 28, 1923 |
| 1,928,903 | Manning | Oct. 3, 1933 |